(12) United States Patent
Kroitzsch et al.

(10) Patent No.: US 6,980,099 B2
(45) Date of Patent: Dec. 27, 2005

(54) ARRANGEMENT FOR MONITORING AT LEAST ONE PARAMETER FOR A NUMBER OF MOTOR VEHICLE WHEELS

(75) Inventors: Johannes Kroitzsch, Erlangen (DE); Jürgen Spotka, Zeitlarn (DE); Martin Prenninger, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 23 days.

(21) Appl. No.: 10/603,945

(22) Filed: Jun. 25, 2003

(65) Prior Publication Data

US 2004/0008108 A1 Jan. 15, 2004

(30) Foreign Application Priority Data

Jul. 1, 2002 (DE) ................. 102 29 465

(51) Int. Cl.$^7$ ........................................ B60C 23/00
(52) U.S. Cl. ........................................ 340/447; 73/146
(58) Field of Search ................. 340/447, 442, 340/445; 73/146, 146.3, 146.5

(56) References Cited

U.S. PATENT DOCUMENTS

| | | | |
|---|---|---|---|
| 3,810,090 A | 5/1974 | Davis et al. ............ 340/447 |
| 4,186,377 A * | 1/1980 | Barabino ............... 340/446 |
| 4,210,898 A * | 7/1980 | Betts ................... 340/443 |
| 5,284,267 A | 2/1994 | Polletta et al. ......... 220/4.14 |
| 5,500,065 A | 3/1996 | Koch et al. ............ 156/123 |
| 5,569,848 A | 10/1996 | Sharp .................. 73/146 |
| 5,573,611 A | 11/1996 | Koch et al. ............ 152/152.1 |
| 5,585,554 A | 12/1996 | Handfield et al. ...... 73/146 |
| 5,717,135 A | 2/1998 | Fiorletta et al. ....... 73/146 |
| 5,895,846 A | 4/1999 | Chamussy et al. ..... 73/146.2 |
| 6,043,737 A | 3/2000 | Shehan et al. ......... 340/442 |
| 6,112,165 A * | 8/2000 | Uhl et al. .............. 702/138 |
| 6,167,920 B1 | 1/2001 | Enge ................... 141/5 |
| 6,243,007 B1 | 6/2001 | McLaughlin et al. .... 340/447 |
| 6,253,802 B1 | 7/2001 | Enge ................... 141/59 |
| 6,275,148 B1 | 8/2001 | Takamura et al. ...... 340/442 |
| 6,278,361 B1 | 8/2001 | Magiawala et al. ..... 340/438 |
| 6,278,363 B1 | 8/2001 | Bezek et al. .......... 340/442 |
| 6,340,930 B1 | 1/2002 | Lin .................... 340/447 |
| 6,349,246 B1 | 2/2002 | Smith et al. .......... 701/1 |
| 6,408,690 B1 | 6/2002 | Young et al. .......... 73/146 |
| 6,434,470 B1 | 8/2002 | Nantz et al. .......... 701/93 |
| 6,443,190 B1 | 9/2002 | Enge ................... 141/7 |
| 6,448,891 B2 | 9/2002 | Barnett ............... 340/438 |
| 6,453,737 B2 | 9/2002 | Young et al. .......... 73/146 |
| 6,591,668 B1 * | 7/2003 | Becherer et al. ....... 73/146 |
| 6,622,553 B2 * | 9/2003 | Hayashi et al. ........ 73/146 |
| 6,748,799 B2 * | 6/2004 | Fischer et al. ........ 73/146.5 |
| 2002/0075145 A1 | 6/2002 | Hardman et al. ....... 340/442 |
| 2002/0095980 A1 | 7/2002 | Breed et al. .......... 73/146 |

(Continued)

FOREIGN PATENT DOCUMENTS

DE 4014379 11/1991 ........... B60C 23/00

(Continued)

*Primary Examiner*—John Tweel, Jr.
(74) *Attorney, Agent, or Firm*—Baker Botts L.L.P.

(57) ABSTRACT

The arrangement for monitoring at least one parameter for a number of motor vehicle wheels uses at least one receiver antenna that features a directional characteristic such that at least the signals which are transmitted by detector units located at two different vehicle wheels can be uniquely assigned to the relevant wheel positions as a result of the different receive level. The use of a number of receiver antennas allows either the number of distinguishable detector units to be increased or a redundancy to be created to improve the reliability of the detection.

18 Claims, 2 Drawing Sheets

U.S. PATENT DOCUMENTS

| | | | |
|---|---|---|---|
| 2002/0116156 A1 | 8/2002 | Remboski et al. | 702/188 |
| 2002/0121132 A1 * | 9/2002 | Breed et al. | 73/146 |
| 2002/0130771 A1 | 9/2002 | Osborne et al. | 340/438 |
| 2002/0149477 A1 * | 10/2002 | Desai et al. | 340/442 |
| 2003/0006893 A1 * | 1/2003 | Dunbridge et al. | 340/444 |
| 2003/0076222 A1 * | 4/2003 | Fischer et al. | 340/442 |

FOREIGN PATENT DOCUMENTS

| | | | |
|---|---|---|---|
| DE | 4224498 | 1/1994 | B60C 23/00 |
| DE | 4232240 | 3/1994 | B60C 23/00 |
| DE | 43 03 583 | 2/1996 | B60C 23/04 |
| DE | 19602593 | 5/1997 | B60C 23/04 |
| DE | DE 196 08 479 A1 | 5/1997 | B60C 23/04 |
| DE | 19650687 A1 | 6/1998 | B60C 23/00 |
| DE | 19522486 | 4/1999 | B60C 23/04 |
| DE | 19852814 A1 | 6/1999 | B67D 5/37 |
| DE | DE 198 56 861 A1 | 6/2000 | B60C 23/04 |
| DE | 199 13 733 | 9/2000 | B60C 23/02 |
| DE | 19933512 * | 1/2001 | B60K 15/05 |
| EP | 0 221 522 | 10/1986 | B60C 23/00 |
| EP | 0 861 160 | 11/1996 | B60C 23/04 |
| EP | 0 967 095 | 6/1999 | B60C 23/04 |

* cited by examiner

ARRANGEMENT FOR MONITORING AT LEAST ONE PARAMETER FOR A NUMBER OF MOTOR VEHICLE WHEELS

PRIORITY

This application claims foreign priority of the German application German Application DE 102 29 465.8 filed on Jul. 1, 2002.

TECHNICAL FIELD OF THE INVENTION

The invention relates to an arrangement for monitoring at least one parameter for a number of motor vehicle wheels.

BACKGROUND OF THE INVENTION

Monitoring parameters of a motor vehicle wheel, for example the tire pressure or the tire temperature, plays a decisive role in the safety of the vehicle or the driver. To dispense with the need for manual checking of these types of parameters devices have been developed with which it is possible to record the parameters of the wheels automatically and display them using the appropriate display devices on the dashboard for example. In such cases it is desirable not only to display the parameters for all the cases in which the allowable range of a parameter has been exceeded but also to specify a unique assignment between the displayed parameters and the position of the wheel concerned. This necessitates an arrangement of this type to be designed in such a way that this assignment will be correctly made even after a wheel has been changed.

As part of an assignment or initialization process, which is undertaken as required or at predetermined intervals, it is necessary to assign the identifier of each detector unit which is allocated to a wheel to the appropriate wheel position, for example "front left", "front right", "rear right", "rear left". In normal operating mode, the identifier, which is contained in a signal sent by one of the number of detector units can then be used as a basis for assigning the relevant wheel position, by the detected identifier being compared with the stored assignment information (the identifiers assigned to wheel positions are stored).

It would of course also be conceivable to execute this type of assignment process each time before a signal of a specific detector unit is interpreted. As a rule however this is too awkward and time-consuming.

A method of assigning transmitters to receiver antennas in tire pressure monitoring systems is known from EP-B-0 861 160, in which a pressure measurement sensor, a transmitter and a send antenna are each assigned to a wheel. In addition each wheel is assigned a receiver antenna on the bodywork which is connected via a cable in each case to the receiving and evaluation electronics. The assignment of the identifiers to wheel positions is made by a signal sent from a transmitter or from the associated transmit antenna being received by all receiver antennas and that the (wheel) position of the receiver antenna which delivers the signal with the greatest intensity is assigned to the corresponding transmitter and its identifier.

The disadvantage here is that each wheel position must be assigned a receiver antenna, which in its turn must be connected via a corresponding cable to the receiving and evaluation electronics. This brings corresponding installation effort and correspondingly high costs for the number of receiver antennas corresponding to the number of wheels.

A system for recording tire pressures is known from U.S. Pat. No. 5,774,047, in which a detector unit with a transmitter is also assigned to each wheel. The transmit signals are evaluated and assigned to the wheel positions by providing at least two receiver antennas, whereby the phase difference and polarity of the two receive signals in each case is evaluated, which is delivered by the at least two receiver antennas on receiving the signal of one and the same transmitter.

This type of evaluation of the polarity and phase relationships of the signals is however linked to considerable expense as regards the circuitry.

SUMMARY OF THE INVENTION

The underlying object of the invention is thus to create an arrangement for monitoring at least one parameter from a number of vehicle wheels, in which a receive signal which is sent by one or more detector units can be simply assigned to the corresponding wheel position with little effort.

The invention may achieve this object by an arrangement to monitor at least one parameter for a number of motor vehicle wheels, comprising a number of detector units, each of which is assigned to a wheel, whereby each detector unit comprises a sensor for recording the at least one parameter and a transmit unit with a transmit antenna, at least one receiver antenna comprising a directional characteristic positioned in such a way in the vehicle that, in connection with the field strengths of the signals sent by the individual transmit units at the location of the at least one receiver antenna produces receive signals of different power in each case for at least two of the transmit units, a central evaluation unit which comprises a receive unit, wherein the receive unit is connected to the at least one receiver antenna; and an evaluation unit coupled with the central evaluation unit which compares the receive power of a received signal with stored threshold values or ranges of values assigned to one wheel position in each case and assigns the received signal to a wheel position, if the threshold value assigned to this wheel position is exceeded or the receive power lies within the range of values assigned to this wheel position.

The directional characteristic of the at least one receiver antenna may be created such that, starting from the position of the receiver antenna, they each produce sensitivities in the direction of the transmit antennas of the at least two signals to be distinguished of the relevant transmit units, for which the difference is greater than a predefined value, in which case this value is selected to enable a clear distinction to be made between the signals using the detected receive power of the two signals. For a vehicle with four wheels two receiver antennas may be provided. One receiver antenna may be provided in a position in the area of the front wheel and one receiver antenna may be provided in a position in the area of the rear wheel, preferably in the area above the wheel arch. The directional characteristic of the receiver antenna at least in the direction of the further wheel of the same lengthwise side of the vehicle may show a low or high sensitivity and in the direction of the further front or rear wheel a high or low sensitivity, so that the evaluation unit can use one receiver antenna in each case to undertake at least one unique assignment of the signals of the transmit units at the wheel positions in the direction of the low and high sensitivity. The directional characteristic of the receiver antennas may be created so that the signal of the transmit unit in the area of the same wheel creates the highest receive power in each case, which is clearly distinguishably higher than the receive power on reception of a signal from the transmit unit in the direction of the high sensitivity of the directional characteristic. The transmit antennas or the entire transmit units or detector units may be identical in design. In the receive unit there may be provision for a further receiver antenna and the receive unit may be positioned adjacent to a transmit unit in such a way that this receiver antenna receives the signal of the adjacent transmit unit with the greatest signal power. The evaluation unit may undertake the assignment of the signals to wheel positions on request or at regular intervals as part of an assignment mode and when doing so may assign a characteristic identifier for the detected wheel position transmitted by one of the transmit units in each case and may store it and wherein the evaluation unit in normal operation assigns the received signals to the wheel positions using a comparison between the identifier transmitted by the transmit units and the stored assignment information (identifier for wheel position). The receive unit may comprise a controllable switch that in each case connects one of a number of receiver antennas with downstream components of receive unit.

The object can also be achieved by a method for monitoring at least one parameter for a number of motor vehicle wheels, comprising the steps of:

recording the at least one parameter;

transmitting the at least one parameter with a transmit antenna, positioning of at least one receiver antenna in such a way in the vehicle that, in connection with the field strengths of the signals sent by the individual transmit units at the location of the at least one receiver antenna produces receive signals of different power in each case for at least two of the transmit units; and comparing the receive power of a received signal with stored threshold values or ranges of values assigned to one wheel position in each case and assigning the received signal to a wheel position, if the threshold value assigned to this wheel position is exceeded or the receive power lies within the range of values assigned to this wheel position.

The method may further comprise the step of starting from the position of the receiver antenna, distinguishing at least two signals of the relevant transmit units by producing sensitivities in the direction of each of the transmit antennas, for which the difference is greater than a predefined value, in which case this value is selected to enable a clear distinction to be made between the signals using the detected receive power of the two signals. The method may further comprise the step of providing one receiver antenna in a position in the area of a front wheel and one receiver antenna in a position in the area of a rear wheel, preferably in the area above the wheel arch. The directional characteristic of the receiver antenna at least in the direction of the further wheel of the same lengthwise side of the vehicle may show a low or high sensitivity and in the direction of the further front or rear wheel a high or low sensitivity, so that the evaluation unit can use one receiver antenna in each case to undertake at least one unique assignment of the signals of the transmit units at the wheel positions in the direction of the low and high sensitivity. The method may further comprise the step of creating the directional characteristic of the receiver antennas in such a way that the signal of the transmit unit in the area of the same wheel creates the highest receive power in each case, which is clearly distinguishably higher than the receive power on reception of a signal from the transmit unit in the direction of the high sensitivity of the directional characteristic. The method may further comprise the steps of providing for a further receiver antenna in the receive unit and positioning the receive unit adjacent to a transmit unit in such a way that this receiver antenna receives the signal of the adjacent transmit unit with the greatest signal power. The evaluation unit may undertake the assignment of the signals to wheel positions on request or at regular intervals as part of an assignment mode and when doing so may assign a characteristic identifier for the detected wheel position transmitted by one of the transmit units in each case and stores it and the evaluation unit in normal operation may assign the received signals to the wheel positions using a comparison between the identifier transmitted by the transmit units and the stored assignment information (identifier for wheel position). The method may further comprise the step of connecting one of a number of receiver antennas with downstream components of the receive unit by means of a switch.

The starting point for the invention is the knowledge that the assignment of a receive signal to the wheel position (or vice-versa) can be achieved in a simple manner by using at least one receiver antenna which features a directional characteristic such that signals sent in conjunction with the field strengths of the signals sent by the individual transmitters at the location of at least one receiver antenna produce receive signals of different powers for at least two transmit units to be distinguished. This means that it is sufficient to simply compare each signal level with stored assignment information to allow the received signal to be assigned to the corresponding wheel position. The stored assignment information comprises a threshold value assigned to each wheel position in each case or a range of values assigned to a wheel position in each case for the receive signal power or the level (voltage) of the receive signal.

In this case the directional characteristic of the at least one receiver antenna can be designed in such a way that the receive characteristic in each direction, starting from the position of the receiver antenna in the direction of the wheel concerned or the position of the detector unit located on it shows a markedly different sensitivity in each case. This would make it possible using a single antenna, to distinguish between all signals of for example four detector units of the vehicle with four wheels.

According to the preferred form of embodiment of the invention, two receiver antennas are provided for a vehicle with four wheels. The preferred configuration here is one receiver antenna in the area of one front wheel and one receiver antenna in the area of one rear wheel. The directional characteristic of the two receiver antennas can be designed so that in the direction of the other wheel on the same side of the vehicle there is a low (high) sensitivity and in the direction of the other front or rear wheel a high (low) sensitivity.

In this way the evaluation unit can use one antenna in each case to at least make a unique assignment of the wheel positions to the signals of the transmit units at the wheel positions in the direction of the low and high sensitivity.

With a further form of embodiment of the invention the directional characteristic of the receiver antenna is further created in such a way or the receiver antenna aligned in relation to the wheel position, in whose environment the receiver antenna is arranged such that the signal of the detector unit assigned to the wheel at this wheel position generates the highest receive power. This receive power should be distinctly and identifiably higher than at the receive power on receipt of a signal from the transmit unit in the direction of high sensitivity of the directional characteristic of the relevant receiver antenna.

The benefit produced in this way is that by using the one antenna the signals of three detector units can be uniquely assigned to the wheel positions concerned. This similarly applies to the other receiver antenna. In this case the redundancy provided (a number of wheel positions can be assigned using both the one and the other receiver antenna) enables higher security to be guaranteed for the assignment.

With the arrangement in accordance with the invention the transmit antennas of the detector units or the entire transmit units or detector units can be designed identically. It is not necessary to design the transmitter units in such a way that the ability to distinguish between the relevant transmit signals is made possible by differing transmit powers.

In the evaluation unit a further receiver antenna can be provided which can also feature a defined directional characteristic in relation to the wheel positions. This additional receiver antenna then serves as a redundant unit and can be included for checking and if necessary correcting the assignment results.

In accordance with the invention the assignment of the signals of the transmit units or detector units to the wheel positions can be undertaken as part of an initialization or assignment process on request or at predetermined intervals. In this case an assignment of the characteristic identifiers sent by the transmit units in each case is made to the wheel position concerned.

The assignment of the receive signals to wheel positions can of course also be undertaken before or during each receive process. The transmission of an identifier can be dispensed with entirely if necessary in this case.

In accordance with the preferred form of embodiment of the invention the central evaluation unit or the receive unit included in it features a controllable switch which in each case connects one of the number of receiver antennas to the downstream components of the receive unit or the evaluation unit.

BRIEF DESCRIPTION OF THE DRAWINGS

The invention is described in more detail below on the basis of the exemplary embodiments shown in the drawing. The drawings show FIG. 1 a schematic diagram of a vehicle with a first form of embodiment of an arrangement for monitoring at least one parameter of the four vehicle wheels.

DETAILED DESCRIPTION OF THE PREFERRED EMBODIMENTS

Figure 1:
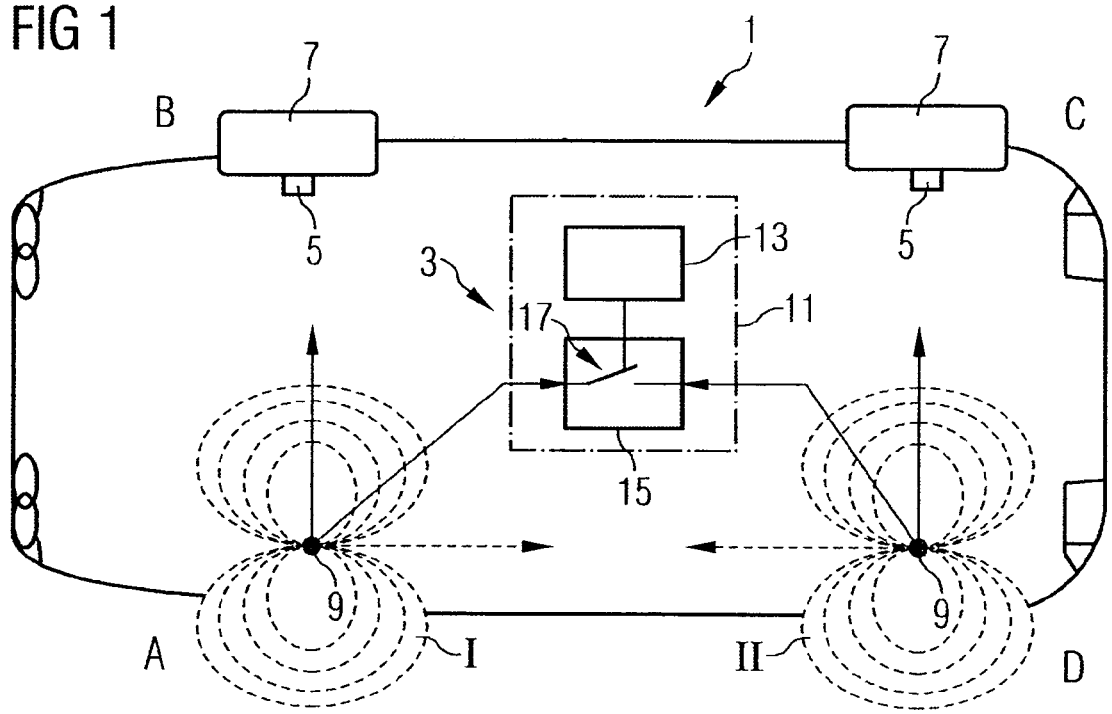

The schematic diagram of a vehicle 1 in FIG. 1 shows the vehicle with an arrangement 3 to monitor at least one parameter for a number (in the example shown, four) of vehicle wheels. The arrangement 3 comprises a total of four detector units 5, whereby one detector unit 5 is assigned to a vehicle wheel 7 in each case. Each detector unit 5 includes a transmitter unit which has not been shown in more detail, which for its part features a transmit antenna in each case. The detector units 5 are preferably designed to be identical for practical reasons.

Arrangement 3 further comprises two receiver antennas 9, whereby in the exemplary embodiment shown in FIG. 1 one receiver antenna 9 is positioned in the area of the front left vehicle wheel 7 and one receiver antenna 9 in the area of the rear left vehicle wheel 7 in a fixed position. To aid clarity the diagram in FIG. 1 does not show the vehicle wheels on the left-hand side of the vehicle. Instead of the directional characteristic of the receiver antenna 9 are shown schematically.

Finally arrangement 3 includes a central evaluation unit 11 which features an evaluation unit 13 and its upstream receive unit 15.

The receiver antennas 9 are connected to the receive unit 15, in which case the receive unit 15 features a controllable switch 17 which directs the signal of a receiver antenna 9 in each case to the further components of the receive unit 15.

Figure 3:
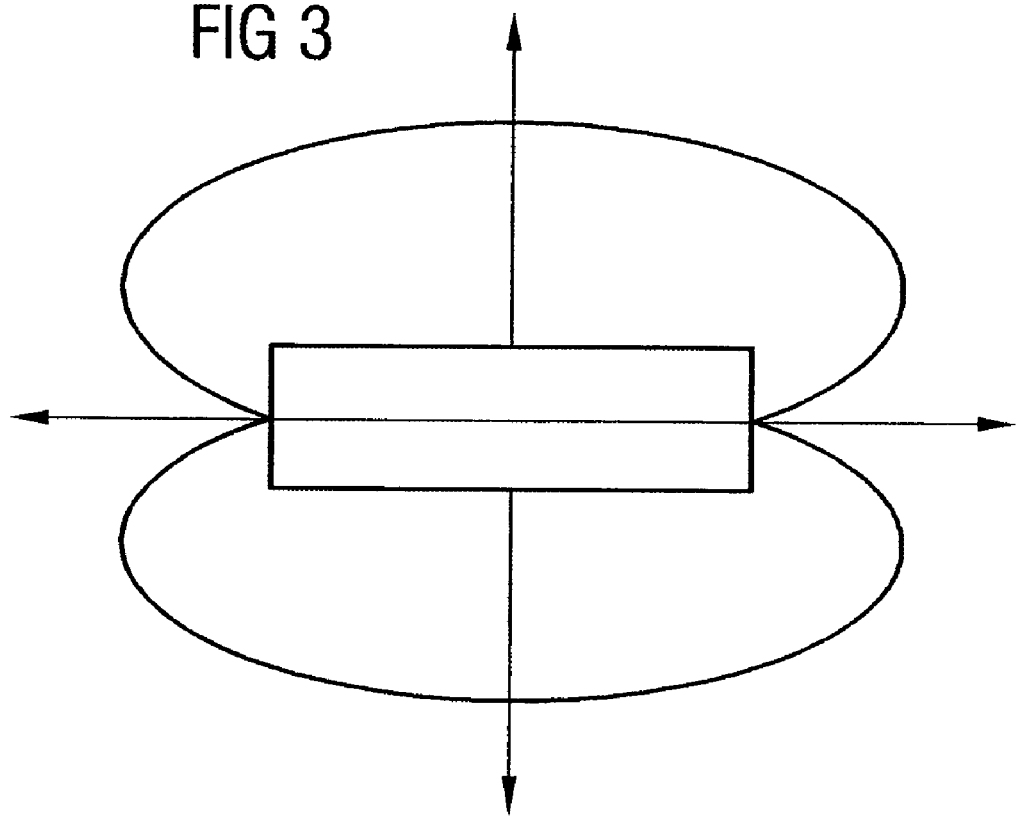
FIG. 3 a schematic diagram of the directional characteristic of a simple dipole-type receiver antenna.

The relatively simple directional characteristic of receiver antenna 9 shown in FIG. 1 and in greater detail in FIG. 3 provide the opportunity, in conjunction with a selected position and alignment of the receiver antennas 9, to distinguish between the transmit signals of detector units 5 in the wheel positions A, B, C, D.

Given an identical design of detector units 5, the following relationships between the receive powers all signal levels P of the receive signals for transmit signals of the detector units in the wheel positions A, B, C, D will be produced for receiver antenna and 9 in the assigned Position I which is adjacent to wheel position A:

$P_I(A) > P_I(B) > P_I(C) > P_I(D)$

For the receiver antenna 9 in the antenna Position II, which is adjacent to wheel position D, the following relationships between the receive signal levels P for transmit signals which are created by the detector units 5 in the wheel positions A, B, C, D are produced in a similar way:

$P_{II}(D) > P_{II}(C) > P_{II}(B) > P_{II}(A)$

Since the spacing of the vehicle wheels in the longitudinal direction is as a rule greater than the spacing of the wheels on a vehicle axle, even with the selected receive characteristic the signals $P_I(B)$ and $P_I(C)$ or the receive signals $P_{II}(C)$ and $P_{II}(B)$ can still be identified although the sensitivity of the simple dipole characteristic selected in the example in the chosen receive direction is still relatively similar.

Of course the directional characteristic of the receiver antenna 9 can be designed so that the sensitivity in these directions differs markedly, so that in this way it is possible to make an even more secure distinction of the receive signals of the detector units located in these wheel positions.

It should be pointed out first of all that this type of distinction or assignment of a received signal can of course be undertaken before or during each reception of a signal sent by a detector unit 5. Instead of this however the preferred method is to use an assignment or initialization process that can be executed by the central evaluation unit 11 on request or at pre-specified intervals that investigates each of the detector units 5 in turn to see the wheel position A, B, C, D at which these are located and to store this information assigned to a characteristic indentifier for the detector unit concerned in the central evaluation and control unit 11. After termination of the assignment process the assignment can then be made in the normal operating mode of arrangement 3 in which the identifier of a receive signal is merely detected and compared with the stored assignment information. Normal operating mode does not require any switch-over of the receiver antennas either. Instead it is sufficient to detect the receiver antennas of all four detector units 5 with one and the same receiver antenna 9.

If an assignment of the receive signals to wheel positions is to be undertaken—whether as part of an assignment or initialization process or on receipt of each signal in the normal operating mode—, switch 17 is first used to connect a receiver antenna with the receive unit 15 and the relevant signal level is determined. In a next step switch 17 is connected with the other receiver antenna 9 and the level of the receive signal as a result of receiving a this same signal with this receiver antenna 9 is determined. The evaluation unit 13 then investigates (or each receive level after it is established), whether this receive level exceeds a threshold that is assigned to the relevant wheel positions A, B, C, D or whether this level lies within range of values assigned in one of the relevant wheel positions. If for example the receive level $P_I$ of a signal which is delivered by a receiver antenna 9 in position I exceeds a threshold value which is assigned to wheel position B but not the threshold value which is assigned to wheel position A, the receive signal of wheel position B is assigned. Thus the process for assigning a signal in the normal operating phase is ended. If an assignment or initialization process is undertaken, the identifier of the signal concerned is detected and stored as assignment information assigned to the relevant wheel position. Furthermore these steps are executed in an assignment or initialization process for the signals sent by all the detector units.

Since both receiver antennas 9 at least theoretically allow a unique assignment of a signal as a result of the selected directional characteristic, the evaluation units 13 cannot just undertake assignment of the signal as a result of the level of receiver antenna 9 in position I, but also an assignment of the signal by investigating the level $P_{II}$ that is delivered by the receiver antenna 9 in position II. This redundancy produces increased safety.

If the detected assignments of the receive signal for the wheel position concerned differ as a result of the investigation of the level delivered by the two antennas, the result can be discarded and the process executed again.

In the same way the receive signals that are delivered by the receiver antennas 9 in position I or II are only used for the assignment of specific wheel positions, for example those wheel positions that can be distinguished and assigned with the greatest reliability.

Figure 2:
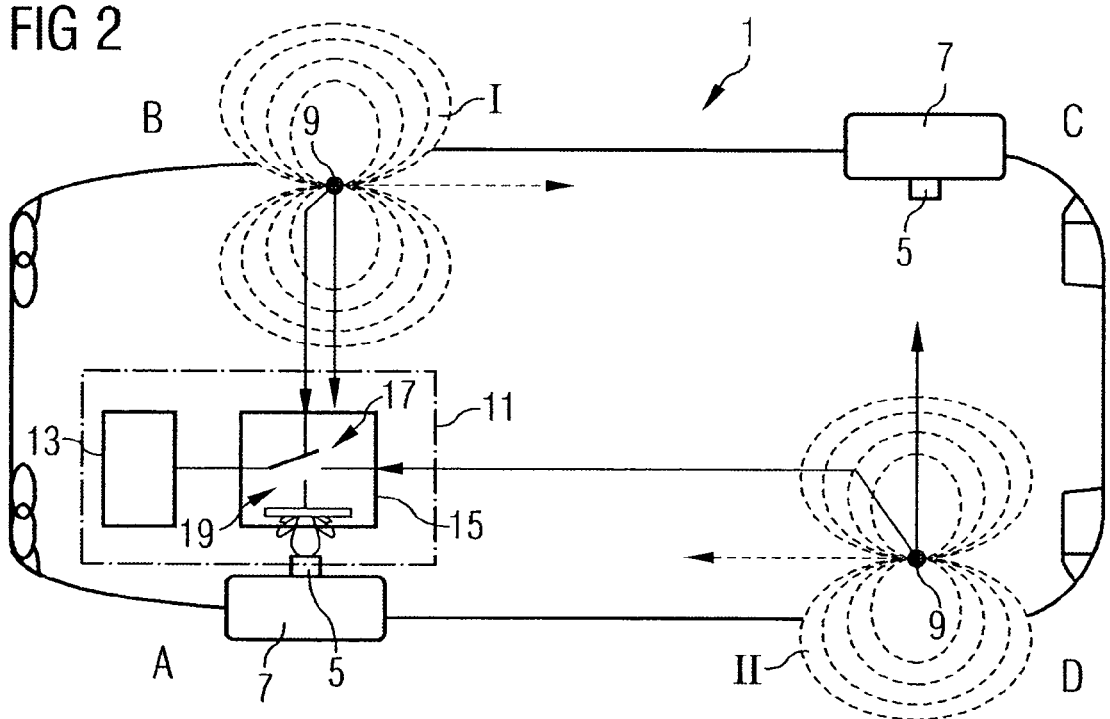
FIG. 2 a schematic diagram of a vehicle with a second form of embodiment of an arrangement for monitoring at least one parameter of the four vehicle wheels.

The further exemplary embodiment shown in FIG. 2 differs from the configuration shown in FIG. 1 merely in that the receiver antennas 9 on opposite lengthwise sides of the vehicle are positioned in the area of the front or rear wheel arch.

With this form of embodiment it is possible, as mentioned previously, to only use receiver antenna 9 in position I for assigning a receive signal to the wheel positions B and C. As a result of the simple directional characteristic there is the danger that the signals of the detector units in wheel positions A and D will only differ slightly in their receive level. These wheel positions can however be securely assigned by evaluating the receive signal supplied by receiver antenna 9 in position II. For the form of embodiment shown in FIG. 2 the following equation for the relationships of the receive level is produced for receiver antenna 9 in position I:

$P_I(B) > P_I(A) > P_I(D) > P_I(C)$

For receiver antenna 9 in position IIthe equation described here is produced for the form of embodiment in accordance with FIG. 1 is produced for the receive level.

Figure 4:
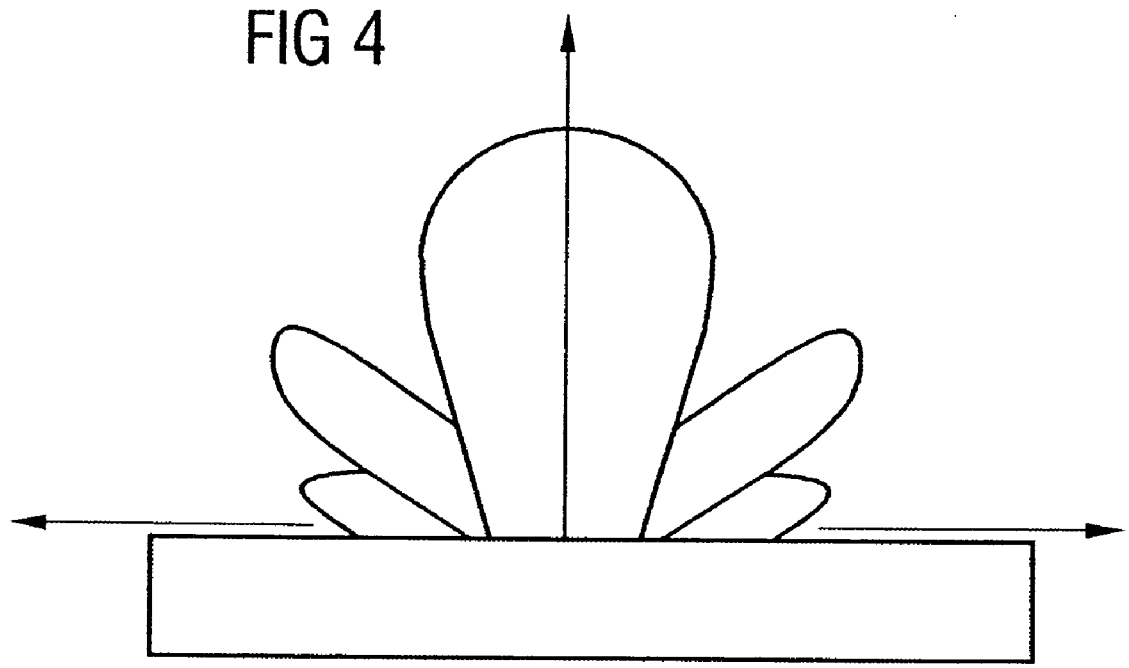
FIG. 4 a simplified diagram of the directional characteristic of an additional antenna to be positioned in the central evaluation unit.

Furthermore in FIG. 2 in the receive unit 15 itself there is provision for a further receiver antenna 19 which is preferably implemented on a printed circuit board of the circuit of receive unit 15. This receiver antenna can for example feature the directional characteristic shown in FIG. 4. If this receiver antenna, as shown in FIG. 2, is aligned with its directional characteristic to position A, the relevant receive signal can be used to control the functional capabilities of the entire arrangement in evaluating the signals of the receiver antenna 9. The further antenna can however also be aligned to one of the remaining wheel positions. Overall the further receiver antenna 19 increases the redundancy of the arrangement and thereby with a suitable evaluation the security of the assignment of the wheel positions A, B, C, D to the receive signals.

What is claimed is:

1. Arrangement to monitor at least one parameter for a number of motor vehicle wheels, comprising:
   a) a number of detector units, each of which is assigned to a wheel, whereby each detector unit comprises a sensor for recording the at least one parameter and a transmit unit with a transmit antenna,
   b) at least one receiver antenna comprising a directional characteristic positioned in such a way in the vehicle that, in connection with the field strengths of the signals sent by the individual transmit units at the location of the at least one receiver antenna produces, receive signals of different power in each case for at least two of the transmit units,
   c) a central evaluation unit which comprises a receive unit, wherein the receive unit is connected to the at least one receiver antenna; and
   d) an evaluation unit coupled with the central evaluation unit which compares the receive power of a received signal with stored threshold values or ranges of values assigned to one wheel position in each case and assigns the received signal to a wheel position, if the threshold value assigned to this wheel position is exceeded or the receive power lies within the range of values assigned to this wheel position.

2. Arrangement in accordance with claim 1, further comprising means for creating the directional characteristic of the at least one receiver antenna such that, starting from the position of the receiver antenna, they each produce sensitivities in the direction of the transmit antennas of the at least two signals to be distinguished of the relevant transmit units, for which the difference is greater than a predefined value, in which case this value is selected to enable a clear distinction to be made between the signals using the detected receive power of the two signals.

3. Arrangement in accordance with claim 1, wherein for a vehicle with four wheels two receiver antennas are provided.

4. Arrangement in accordance with claim 3, wherein one receiver antenna is provided in a position in the area of the front wheel and one receiver antenna is provided in a position in the area of the rear wheel, preferably in the area above the wheel arch.

5. Arrangement in accordance with claim 4, wherein the directional characteristic of the receiver antenna at least in the direction of the further wheel of the same lengthwise side of the vehicle shows a low or high sensitivity and in the direction of the further front or rear wheel a high or low sensitivity, so that the evaluation unit can use one receiver antenna in each case to undertake at least one unique assignment of the signals of the transmit units at the wheel positions in the direction of the low and high sensitivity.

6. Arrangement in accordance with claim 5, wherein the directional characteristic of the receiver antennas is created so that the signal of the transmit unit in the area of the same wheel creates the highest receive power in each case, which is clearly distinguishably higher than the receive power on reception of a signal from the transmit unit in the direction of the high sensitivity of the directional characteristic.

7. Arrangement in accordance with claim 1, wherein the transmit antennas or the entire transmit units or detector units are identical in design.

8. Arrangement in accordance with claim 1, wherein in the receive unit there is provision for a further receiver antenna and wherein the receive unit is positioned adjacent to a transmit unit in such a way that this receiver antenna receives the signal of the adjacent transmit unit with the greatest signal power.

9. Arrangement in accordance with claim 1, wherein the evaluation unit comprises means for undertaking the assignment of the signals to wheel positions on request or at regular intervals as part of an assignment mode and when doing so assigns a characteristic identifier for the detected wheel position transmitted by one of the transmit units in each case and stores it and wherein the means in normal operation assign the received signals to the wheel positions using a comparison between the identifier transmitted by the transmit units and the stored assignment information (identifier for wheel position).

10. Arrangement in accordance with claim 1, wherein the receive unit comprises a controllable switch that in each case connects one of a number of receiver antennas with downstream components of receive unit.

11. Method for monitoring at least one parameter for a number of motor vehicle wheels, comprising the steps of:
  a) recording the at least one parameter;
  b) transmitting the at least one parameter with a transmit antenna, positioning at least one receiver antenna in such a way in the vehicle that, in connection with the field strengths of the signals sent by the individual transmit units at the location of the at least one receiver antenna produces receive signals of different power in each case for at least two of the transmit units; and
  c) comparing the receive power of a received signal with stored threshold values or ranges of values assigned to one wheel position in each case and assigning the received signal to a wheel position, if the threshold value assigned to this wheel position is exceeded or the receive power lies within the range of values assigned to this wheel position.

12. The method in accordance with claim 11, further comprising the steps of: starting from the position of the receiver antenna, distinguishing at least two signals of the relevant transmit units by producing sensitivities in the direction of each of the transmit antennas, for which the difference is greater than a predefined value, in which case this value is selected to enable a clear distinction to be made between the signals using the detected receive power of the two signals.

13. The method in accordance with claim 12, further comprising the step of providing one receiver antenna in a position in the area of a front wheel and one receiver antenna in a position in the area of a rear wheel, preferably in the area above the wheel arch.

14. The method in accordance with claim 13, wherein the directional characteristic of the receiver antenna at least in the direction of the further wheel of the same lengthwise side of the vehicle shows a low or high sensitivity and in the direction of the further front or rear wheel a high or low sensitivity, so that the evaluation unit can use one receiver antenna in each case to undertake at least one unique assignment of the signals of the transmit units at the wheel positions in the direction of the low and high sensitivity.

15. The method in accordance with claim 14, further comprising the step of creating the directional characteristic of the receiver antennas in such a way that the signal of the transmit unit in the area of the same wheel creates the highest receive power in each case, which is clearly distinguishably higher than the receive power on reception of a signal from the transmit unit in the direction of the high sensitivity of the directional characteristic.

16. The method in accordance with claim 11, further comprising the steps of: providing for a further receiver antenna in the receive unit and positioning the receive unit adjacent to a transmit unit in such a way that this receiver antenna receives the signal of the adjacent transmit unit with the greatest signal power.

17. The method in accordance with claim 11, wherein the evaluation unit undertakes the assignment of the signals to wheel positions on request or at regular intervals as part of an assignment mode and when doing so assigns a characteristic identifier for the detected wheel position transmitted by one of the transmit units in each case and stores it and the evaluation unit in normal operation assigns the received signals to the wheel positions using a comparison between the identifier transmitted by the transmit units and the stored assignment information (identifier for wheel position).

18. The method in accordance with claim 11, further comprising the step of connecting one of a number of receiver antennas with downstream components of the receive unit by means of a switch.

* * * * *